(12) United States Patent
Marta

(10) Patent No.: US 10,233,952 B1
(45) Date of Patent: Mar. 19, 2019

(54) METHOD OF PROFILING OPENINGS OF ELEMENTS OF MECHANICAL SYSTEM FOR GENERATING OPTIMAL PRESSURE WAVES IN ELASTIC FLUIDS

(71) Applicant: Ion Marta, Philadelphia, PA (US)

(72) Inventor: Ion Marta, Philadelphia, PA (US)

( * ) Notice: Subject to any disclaimer, the term of this patent is extended or adjusted under 35 U.S.C. 154(b) by 0 days.

(21) Appl. No.: 16/053,229

(22) Filed: Aug. 2, 2018

Related U.S. Application Data

(60) Provisional application No. 62/606,270, filed on Sep. 18, 2017.

(51) Int. Cl.
*B65G 53/58* (2006.01)
*F15D 1/02* (2006.01)

(52) U.S. Cl.
CPC .................................. *F15D 1/02* (2013.01)

(58) Field of Classification Search
CPC ........ B65G 53/04; B65G 53/28; B65G 53/30; B65G 53/50; B65G 53/526; B65G 53/52; F15D 1/02
USPC ................. 406/12, 14, 26, 85, 192, 197, 198
See application file for complete search history.

(56) References Cited

U.S. PATENT DOCUMENTS

| | | | | |
|---|---|---|---|---|
| 3,649,081 A | * | 3/1972 | Johnson | H05K 13/027 406/85 |
| 5,593,252 A | * | 1/1997 | Relin | B65G 53/24 15/404 |
| 5,863,155 A | * | 1/1999 | Segota | B65G 53/08 406/61 |
| 6,827,528 B1 | * | 12/2004 | Relin | B65G 23/00 406/106 |
| 8,573,896 B2 | * | 11/2013 | Relin | F04B 35/04 406/10 |
| 8,591,152 B2 | * | 11/2013 | Funk | C08J 3/12 406/197 |
| 9,618,263 B2 | * | 4/2017 | Hogan | F26B 21/004 |
| 9,834,391 B2 | * | 12/2017 | Mauchle | B65G 53/14 |
| D810,785 S | * | 2/2018 | Alfes | D15/5 |
| 2011/0194904 A1 | * | 8/2011 | Carlson | F04B 49/22 406/12 |

* cited by examiner

*Primary Examiner* — Joseph A Dillon, Jr.
(74) *Attorney, Agent, or Firm* — Dennemeyer & Associates, LLC

(57) ABSTRACT

A method of and for optimizing pressure waves in fluids and profiling openings of elements of mechanical system to optimize systems, is provided. The method aids in the generation of pressure waves with predetermined waveform in elastic fluids and can be used to increase the energy efficiency in the pipeline technologies for the transportation of flowable media, one-phase and multi-phase, homogeneous, and heterogeneous media; powders, disperse mixtures; and technologies of forced extraction of liquids from capillary porous saturated media. Wherein, in the use of the method, changing a value of at least one of the parameters of the generating waves consisting of the shapes, sizes and single-position location of surfaces profiles of openings, amplitude, frequency, waveform, and the pressure difference ($P^+$-$P^-$) measured on the pump of generating compression and rarefaction pressure waves so, that an energy efficiency of a process of generating pressure waves determined by minimal value of the specific ratio and therefore a maximum energy efficiency of the interaction of the specific wave energy with the elastic fluid flow, is optimized.

3 Claims, 10 Drawing Sheets

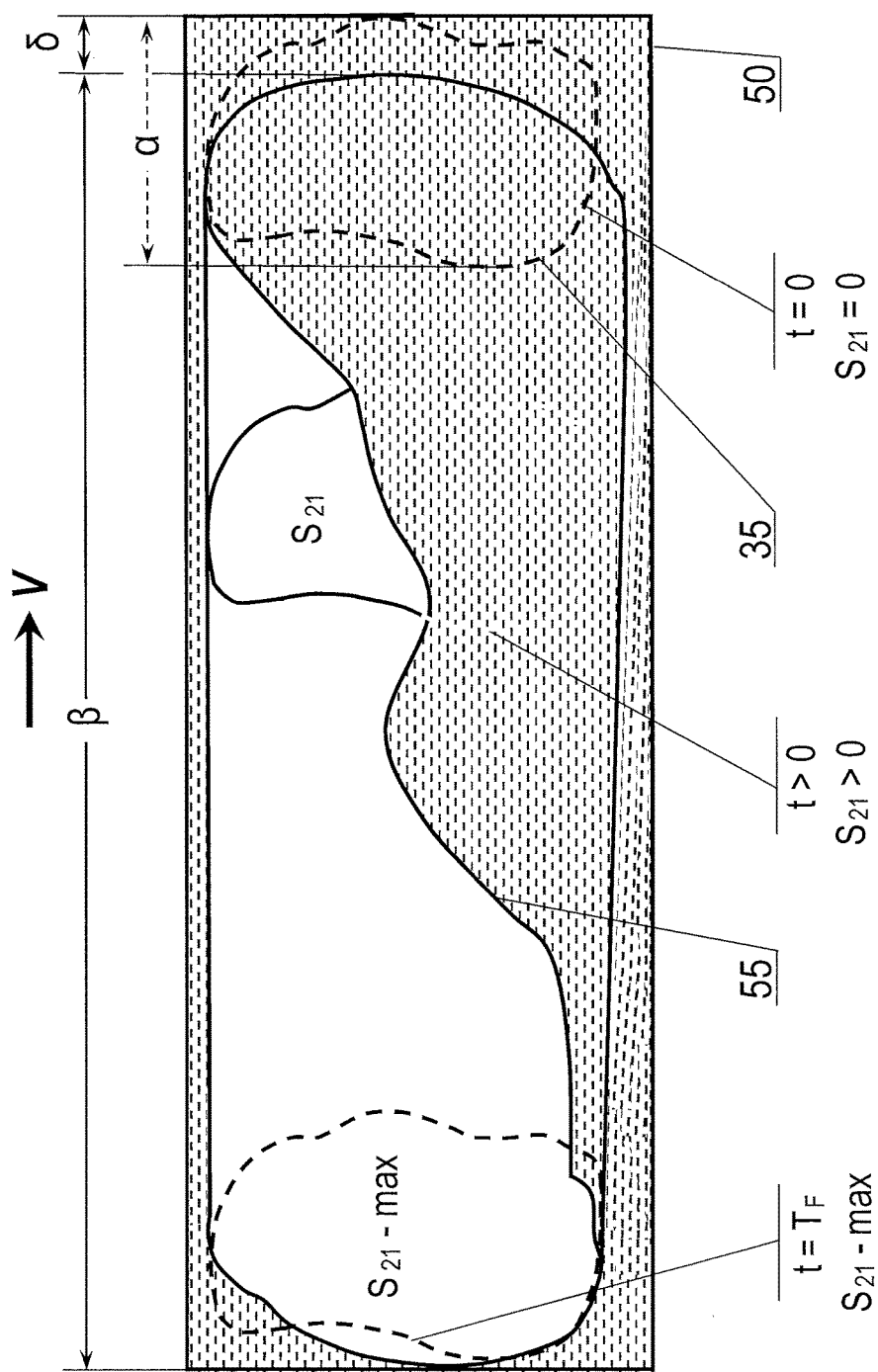

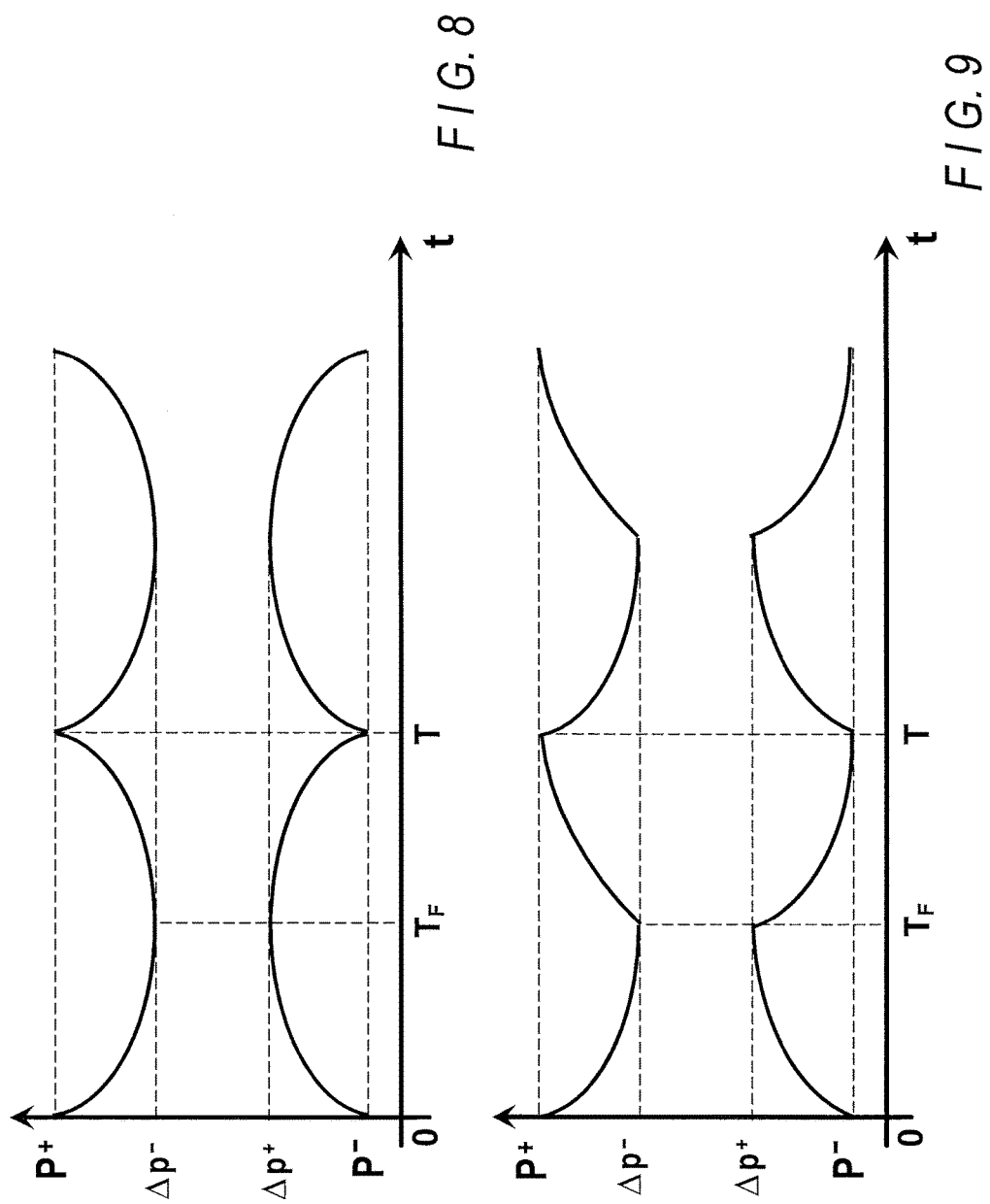

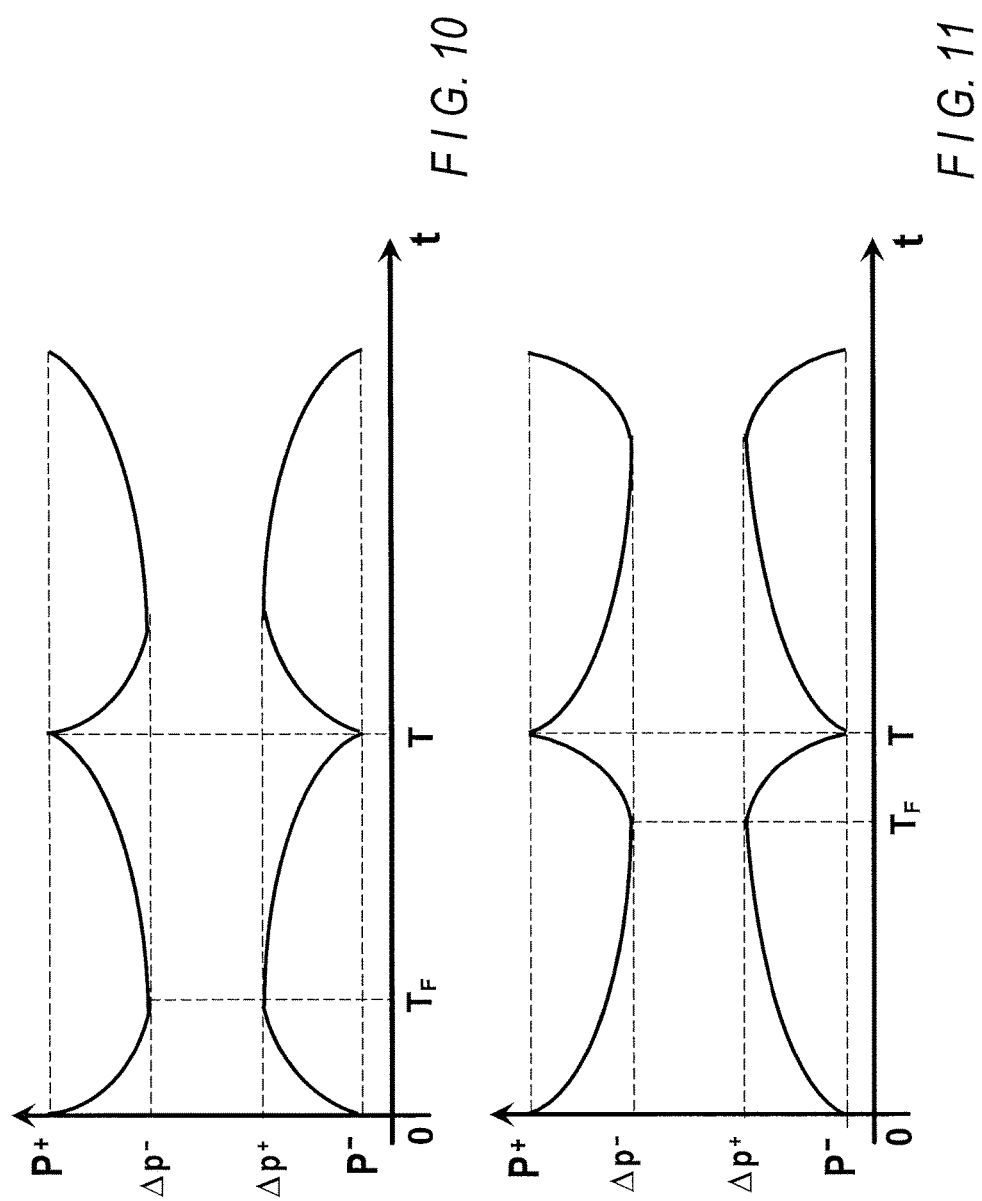

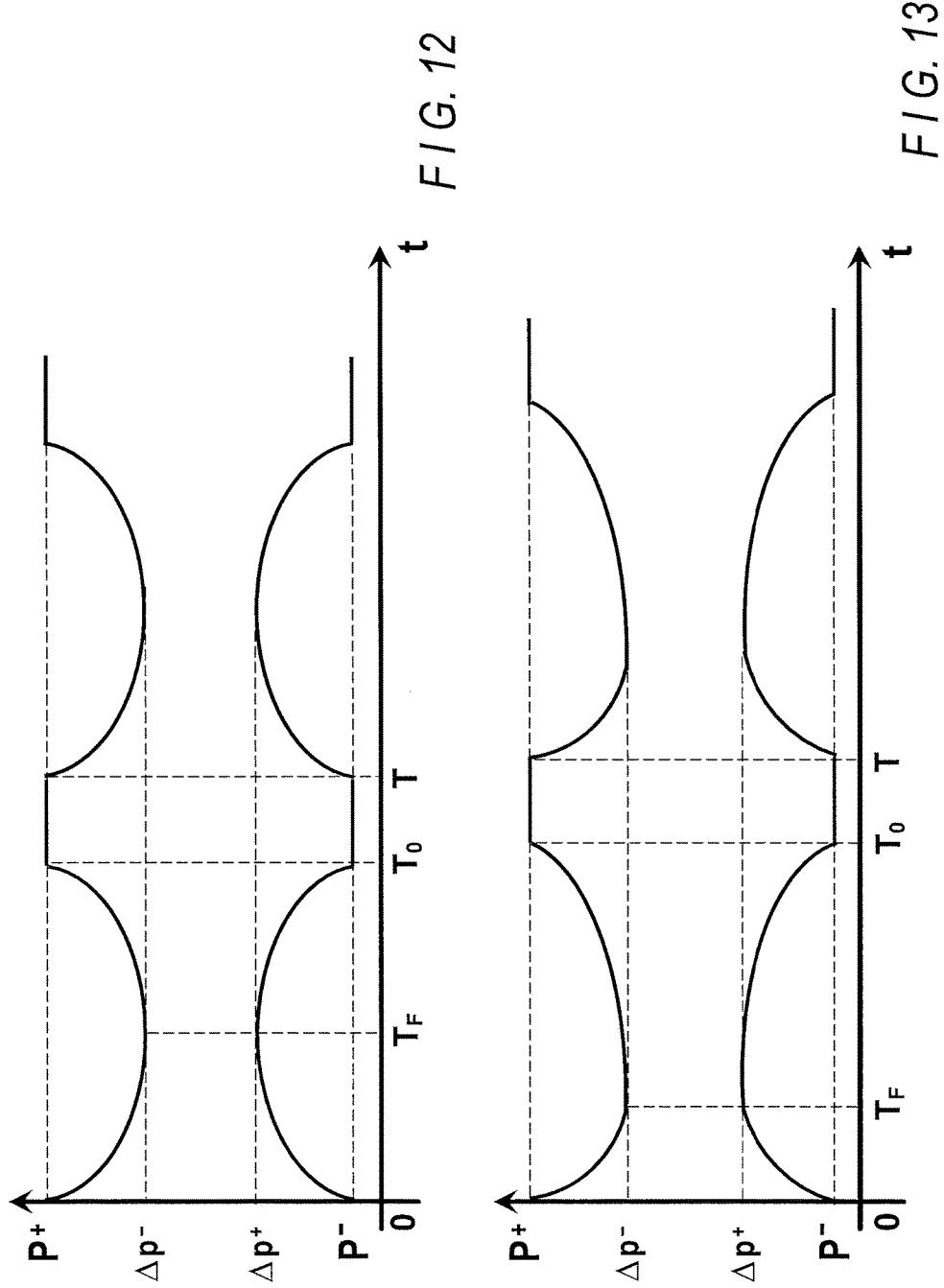

US 10,233,952 B1

METHOD OF PROFILING OPENINGS OF ELEMENTS OF MECHANICAL SYSTEM FOR GENERATING OPTIMAL PRESSURE WAVES IN ELASTIC FLUIDS

TECHNICAL FIELD

The present invention relates to a method of profiling surfaces of openings of elements of mechanical system, which provide the generating pressure waves in elastic fluids with predetermined optimal waveform. It can be used to increase the energy efficiency in the pipeline technologies for the transportation of flowable media: one—phase and multiphasic, homogeneous, and heterogeneous media; powders, disperse mixtures; technologies of forced filtration, extraction of liquids from capillary porous saturated media, heat and mass transfer.

BACKGROUND OF THE INVENTION

Known methods for generating pressure waves in airflows use the periodic connection of air domains at different pressures: pressure of the suction airflow in the pipeline with atmospheric pressure.

The idea of the use of periodic connection of the suction flow with the atmosphere—modulation of the suction flow, leads to an increase of the energy efficiency of the surface cleaning process using vacuum cleaning systems (U.S. Pat. No. 5,593,252, 1997). The further development of this idea extends the possibilities of application of more efficient energy modulated flows in a variety of technologies (U.S. Pat. No. 6,827,528, 2004). These include technologies using the surface modulated flows—above and underground apparatuses, airplanes etc., and volumetric modulated flows—transportation of fluid media through suction and discharge pipelines.

The use of an asymmetric drop-shaped form of the law of pressure change of the modulated waves (U.S. Pat. No. 8,573,896, 2013) allows it to significantly expand the potentialities of the applications of modulated flows and to increase the energy efficiency of the processes of pipeline transportation of one and multiphasic media with different physical properties (density, viscosity and heat conductivity), of filtering processes, of heat exchange processes; the improving oil recovery from the oil saturated stratum and others.

The increase of energy efficiency of all of the above mentioned possible applications of modulated flows in various technological processes are directly related to physical phenomena caused by the interaction of modulated pressure waves with given parameters, with the flow turbulence of the transporting medium, with the filtration system, with capillary porous medium of saturated stratum, for example. Additionally, parameters of these modulated pressure waves (amplitude, frequency, and law) are unambiguous, for each technological process and determine its energy efficiency. For example, the use of modulated pressure waves in the process of increasing oil production from the saturated stratum requires a larger value of the amplitude and a smaller value of the ratio of the front time $T_{F(oil)}$ to the period of generated waves $T_{(oil)}$, $T_{F(oil)}/T_{(oil)}$, than in the process of pipeline transportation of water, $(T_{F(oil)}/T_{(oil)}) \ll (T_{F(water)}/T_{(water)})$. Moreover, the periods, frequencies, and laws (waveform) of pressure waves for these processes are different.

In all of the above noted technological processes there is given an affirmation of the consequences of the interaction between pressure waves and the given material medium, filter system or heat exchange surface. In those processes there already is assumed that the generated modulated pressure waves have the specified parameters (waveform), corresponding to the given process. No dependence of the physical properties of fluid: density, viscosity, and compressibility and values of over pressure and under pressure of are taken into account.

However, in spite of the quite diverse possible industrial applications of modulated pressure waves to reduce energy consumption in energy-intensive technological processes, there is presently no proper method of generating pressure waves with predetermined parameters of waveform for the given parameters of a technological process.

SUMMARY OF THE INVENTION

In accordance with the present invention a method of profiling surfaces of cross-sections openings of elements of mechanical system for generating pressure waves with optimal waveform in elastic fluids, is based on the parameters of a technological process. For example, for a pipeline transporting process: length, diameter and configuration of a pipeline; flow rate, density, viscosity, compressibility and temperature of the transported medium. Once one or more of those parameters is determined, the specific generated wave energy necessary to ensure the maximum energy efficiency of a given technological process can be estimated.

In a general overview of the invention, a method of profiling openings and optimizing a value of at least one characteristic of an elastic fluid flow in a mechanical system for the forced moving of elastic fluid flows through conduits, with respect to energy efficiency of the flow process of the elastic fluid, is provided, comprising the steps of providing a mechanical system comprising a controlled drive, a first housing within a second housing a pump and a pressure wave generator.

In a preferred embodiment, the mechanical system would include a controlled drive, which will be explained in greater detail below.

The first housing, noted above, would be formed with an inner chamber formed with a first end cap and a second end cap held in a generally parallel configuration to each other and rigidly connected to a shaft of the controlled drive so that it is rotatable. The first housing would comprise a first wall, having an inner surface and an outer surface and also having a first longitudinal end and a second longitudinal end and a first lateral end and a second lateral end. The first wall would have an opening defined therein and would connected to the first end cap and the second end cap, respectively, at its first longitudinal end and its second longitudinal end. The first lateral end of the wall would be joined to the second lateral end to form, with the first end cap and second end cap, a container.

In the present embodiment, the first housing would also have an output connected to a first pipe, such that, the inner chamber of the first housing and the first pipe form together a first volume filled with elastic fluid exposed to an under pressure.

The second housing, noted above, would have a similar construction, having an inner chamber, within which the first housing is placed. The interaction between the first and second housing, as will be described in greater detail below, being paramount to the function of the invention. The second housing is fixed from rotation motion and formed with a third end cap and a fourth end cap held in a generally parallel configuration to each other and, a second wall. The second wall having an inner and outer surface and a first longitudinal end, a second longitudinal end, a first lateral end and a second lateral end; the second wall defining an opening. The second wall is connected to the third end cap and the fourth end cap, respectively at its first longitudinal end and its second longitudinal end and the first lateral end of the second wall is joined to the second lateral end of the second wall to form, with the third end cap and fourth end cap, a container with, and an opening defined therein.

The interaction between the first and second housing, is carried out through the openings in the first and the second walls, whose surfaces of cross-sections have the given shapes, sizes and single-position location, as will be described in greater detail below.

In embodiments, the inner surface of the second wall is located equidistantly from the outer surface of the first wall of the first housing when the first housing is placed within the second housing. The second housing has an input connected to a second pipe, wherein, the second housing and the second pipe form together a second volume filled with the first housing and an elastic fluid exposed to an over pressure. It will be understood that the axis of symmetry of the first housing and the second housing coinciding with the axes of rotation of the shaft of the controlled drive in the present embodiment.

It will be understood then that with the addition of a pump, creating over pressure $P^+$ in the discharge pipeline and under pressure $P^-$ in the suction pipeline, the mechanical system described comprises a pressure wave generator, configured for generating longitudinal pressure waves by rotating the first housing within the second housing thereby creating an intersection of the surface of a cross-sectional opening in the first wall with the surface of a cross-sectional opening in the second wall during the rotating motion of the first wall relatively to the second wall by the drive, and for providing for the propagating of the generated waves through elastic fluid flow though conduits.

With the mechanical system provided as the initial step of the method of the present invention, the next steps of the method will include, generating pressure waves in the elastic fluid by using the pressure wave generator and providing a shape of a profile of a cross-sectional opening in the first wall of the inner chamber and providing the sizes of a profile of a cross-section opening in the first wall. Providing a shape of a profile of a cross-section opening in the second wall of the inner chamber and providing sizes of a profile of a cross-section opening in the second wall. Providing the single-position location of the surface of the cross-section opening in the first wall of the inner chamber and of the surface of the cross-section opening in the second wall of the inner chamber so, that during the rotating of the first wall relatively to the second wall there is provided a periodically intersection of the surfaces of cross-sectional openings which forms a common surface between the first volume and the second volume with changeable shape and sizes depending on the intersected surfaces of profiles of the openings whose shape and sizes of the common surface are changing periodically and univocal versus time by a determined law. Increasing the common surface from zero to the maximal value during a front time of each period and decreasing the common surface from the maximal value to zero out during a back time of each period.

Further, the inventive steps include providing a periodic connection of the first volume, exposed to under pressure with the second volume, exposed to over pressure through the common surface and generating simultaneously a compression pressure wave and a rarefaction pressure wave on the common surface. Providing a frequency of generating compression pressure wave and a rarefaction pressure waves in correspondence with the amplitude of the common surface and providing a frequency of generating compression pressure wave and a rarefaction pressure waves in correspondence with the frequency of the common surface. Providing a waveform of generating compression pressure wave and rarefaction pressure waves in correspondence with the form of the common surface and values of over pressure and under pressure. Providing the propagating of generating compression pressure wave through elastic fluid in the first volume. Providing the propagating of generating rarefaction pressure wave through elastic fluid in the second volume.

Once all of these elements are provided, the next steps of controlling an average value of a total specific energy of the elastic fluid flow by using a difference between over pressure and under pressure of the first volume and the second volume and evaluating of specific average value of a wave energy of pressure waves propagating and interacting with the elastic fluid flow during a period considering a density, viscosity and compressibility of the fluid flow. Evaluating of a specific value of a ratio of an average value of specific wave energy of generating pressure waves propagating and interacting with the elastic fluid flow during a period and an average value of a total specific energy of the elastic fluid flow.

Then changing a value of at least one of the parameters of the generating waves consisting of the shapes, sizes and single-position location of surfaces profiles of cross-section openings, amplitude, frequency and waveform of generating compression and rarefaction pressure waves so, that an energy efficiency of a process of generating pressure waves determined by minimal value of the specific ratio and therefore a maximum energy efficiency of the interaction of the specific wave energy with the elastic fluid flow is optimized.

In some embodiments, the method can further provide the shape and sizes of the profiles of the openings defined in the walls of the inner symmetrical element and of the outer symmetrical element and performing such single-position location of the profiles of the shapes of the openings defined in the wall of the inner and outer symmetric elements which provides generating of the pressure waves by the symmetrical law of change of pressure versus time.

Additionally, in the invention, providing the shape and sizes of the profiles of the openings defined in the walls of the inner symmetrical element and of the outer symmetrical element and then performing such single-position location of the profiles of the shapes of the openings the inner and outer symmetric elements provides a generation of the pressure waves by the asymmetrical law of change of pressure versus time.

It will be understood then that the proposed method provides the shapes and sizes of surfaces profiles of the of cross-sections and the single-positions location of the openings in the first wall and in the second wall, which inner surface of the second wall is equidistantly located from the outer surface of the first wall of housings of the mechanical system, which provides the generation of pressure waves in elastic fluids with predetermined waveform.

The process of generating pressure waves is carried out as a result of the exchange of an impulse of pressure between the first volume filled with elastic fluid exposed to under pressure $P^-$ and the second volume filled with elastic fluid exposed to over pressure $P^+$, through the common surface. A common surface is the connecting surface which forms during the intersection of the surfaces of cross-sections of the openings of the profiles in the first wall and in the second wall of housings, filled with elastic fluid with over pressure $P^+$ and under pressure $P^-$ respectively, during their relative motion. The amplitude and waveform of pressure variation in the generated waves depends on the elastic properties of fluid, and its state of compressibility, determined by values of over pressure $P^+$ and under pressure $P^-$. It also depends on magnitude of the rate (speed) of change of the common surface vs. time. This speed determines the periodicity of the change of the common surface and, consequently, the periodicity of the generated pressure waves, that is, the frequency of the generated pressure waves. Consequently, the form of generated pressure waves is determined by the geometric sizes of the cylindrical walls (radiuses); shapes, sizes and the single-positions location of the surfaces of openings in the first wall and in the second wall; the values of over pressure $P^+$ and under pressure $P^-$; density and compressibility of the fluid, the angular speed of the first wall relatively to the second wall, which determines the wave frequency. And for a given frequency, it is set the front time and back time. These times are changed and depend on frequency (period).

Such dependence imposes lower restrictions on the geometrical sizes of the first wall and of the second wall of the mechanical system for generating pressure waves. For example, in the case of coaxially location of the first and of the second cylindrical walls, the length of circumference of the movable first wall has to be greater or equal to the length of the profile of the shape of cross-section of opening. This condition practically sets the diameter of the second cylindrical wall. The shapes, sizes and the single-position locations of the surface profile of the cross-sections of opening in the first and in the second cylindrical walls of the housings also depend on their respective diameters.

Consequently, the speed of the relative motion of the walls determines the frequency of generated pressure waves, which depends on the magnitude of these diameters. During one wave period T, the value of the common surface varies from zero to the maximum value, $S_{max}$, in the time interval $0 \ldots T_F$ ($T_F$ is a front time), progresses from the maximum value to zero, in the time interval of $T_F \ldots T$, (T-T $F$=T $B$—is the back time, T is a period of generated pressure waves). In addition, the shape and sizes of the common surface are increased to the maximum value $S_{max}$ by one law, $S_1(t)$, and are decreased from the maximum value to zero by another law, $S_2(t)$. Both of these laws depend on the shapes, sizes, the single-position location of surfaces of the profiles of cross-sections of openings in the walls of housings, and of the speed of relative motion of the walls. Wherein the waveform of the generated pressure waves is uniquely determined by the law of variation of the common surface of the cross section of intersected surfaces of profiles vs. time, and by the values of the pressures $P^+$ and $P^-$. Consequently, the form of generated pressure waves is determined by the geometric sizes of the cylindrical wall; shape, sizes and the single-position location of the surfaces of cross-sections of openings in the first wall and in the second wall; the values of pressures $P^+$ and $P^-$; density and compressibility of the fluid; the angular velocity of the first wall relatively to the second wall, which determines the wave frequency. And for a given wave frequency, it is set the front time and back time. These times are changed and depend on wave frequency (period).

By choosing the shape and location of the profiles of the cross-sections of openings can be generated symmetrical waveforms, in which the pressure depends on time by parabolic or by sinusoidal laws and asymmetrical waveforms, for example, by the law of the drop-shape form (U.S. Pat. No. 8,573,896; 2013). The law of pressure variation in generated waves contains both the amplitude and the frequency and it is equivalent with the waveform. The waveform is determined by the solution of physical problems of the interaction between wave energy of pressure waves and the elastic fluid flow in the given technological process and by the optimization of the energy efficiency of the process.

The energy efficiency of the technological process is determined by the interaction of the fluid medium (in the stationary or moving states) with the wave energy. The resulting effects depend on the amplitude-frequency characteristics of the generated pressure waves.

One of the main advantages of the proposed method is the possibility of providing any law of pressure variation in the generated waves corresponding to technological process parameters. This is carried out by evaluating the sizes of the first and of the second walls, providing the shape, sizes and the single-position location of profiles of the cross-sections of openings in the first and in the second walls.

Static Fluids.

Increasing of oil recovery from the oil-saturated reservoir rock. Experimental and theoretical studies show that the asymmetric law of the drop-shaped form of pressure change in the generated wave is the most effective. Moreover, the ratio of the front time to the wave period is less than 0.1 and depends on the properties of the capillary-porous of oil-saturated reservoir rock (porosity) and of the dynamic viscosity of oil.

Moving Medium.

Pipeline transportation of the turbulent elastic fluid flow. The possibility of changing the structure of the turbulent flow is provided by a ratio $0.1<(T_F/T)<0.45$ and of a certain range of amplitudes and a periods of pressure waves. Values $T_F$ and T are related with the average time of the turbulent energy cascade and with the average turbulence scale in the flow.

Results of experimental and theoretical studies show the possibility of changing the structure of flow turbulence and its hydrodynamic resistance under the influence of pressure perturbations. These are small amplitude pressure waves (of a certain frequency, amplitude and law), compared with the static pressure in the flow. Interaction between perturbations and elastic fluid flow, leads to suppressing of turbulence, forming of ordered and coherent structures, anisotropyzatioin and re-laminarization of turbulence. At the end all these structural changes of the turbulent flow, under the influence of the pressure perturbations, lead to a reduction of the hydrodynamic resistance. Estimated values of the energy-efficient parameters of the technological process determine the law—waveform. To ensure the generated wave according to a determined law, it is necessary to provide the appropriate laws for changing the cross sections $S_1(t)$ and $S_2(t)$, which are provided by the shape, size and single-position location of the profiles of the openings in the first and in the second walls of the housings of the mechanical system. Advantages of the proposed method of profiling openings of walls of housings of a mechanical system is that the use of effects of interaction of elastic fluid flow with wave energy of pressure waves varying according by a predetermined law generated by a mechanical system ensures an increase in the energy efficiency of a variety of technological processes: pipeline transportation; heat and mass transfer; burning, the increase in oil production from oil-saturated reservoir rock, and others.

BRIEF DESCRIPTION OF THE DRAWINGS

FIG. 7 is a chart of outer cylindrical fixed and inner cylindrical movable walls on a plane surface, comprising the relative single-position location of profiles of the surfaces of cross-sections of openings, γ=δ.

FIG. 8 is the curve of symmetrical waveform of the generated wave, $T_F$=T/2.

FIG. 9 is the curve of asymmetrical waveform of the generated wave, $T_F$=T/2.

FIG. 10 is the curve of asymmetrical waveform of the generated wave, $T_F$<T/2.

FIG. 11 is the curve of asymmetrical waveform of the generated wave, $T_F$>T/2.

FIG. 12 is the curve of symmetrical waveform of the generated wave with a pulse delay, $T_F$=T/2.

FIG. 13 is the curve of asymmetrical waveform of the generated wave with a pulse delay, $T_F$<T/2.

DETAILED DESCRIPTION OF THE ILLUSTRATIVE EMBODIMENT

Figure 1:
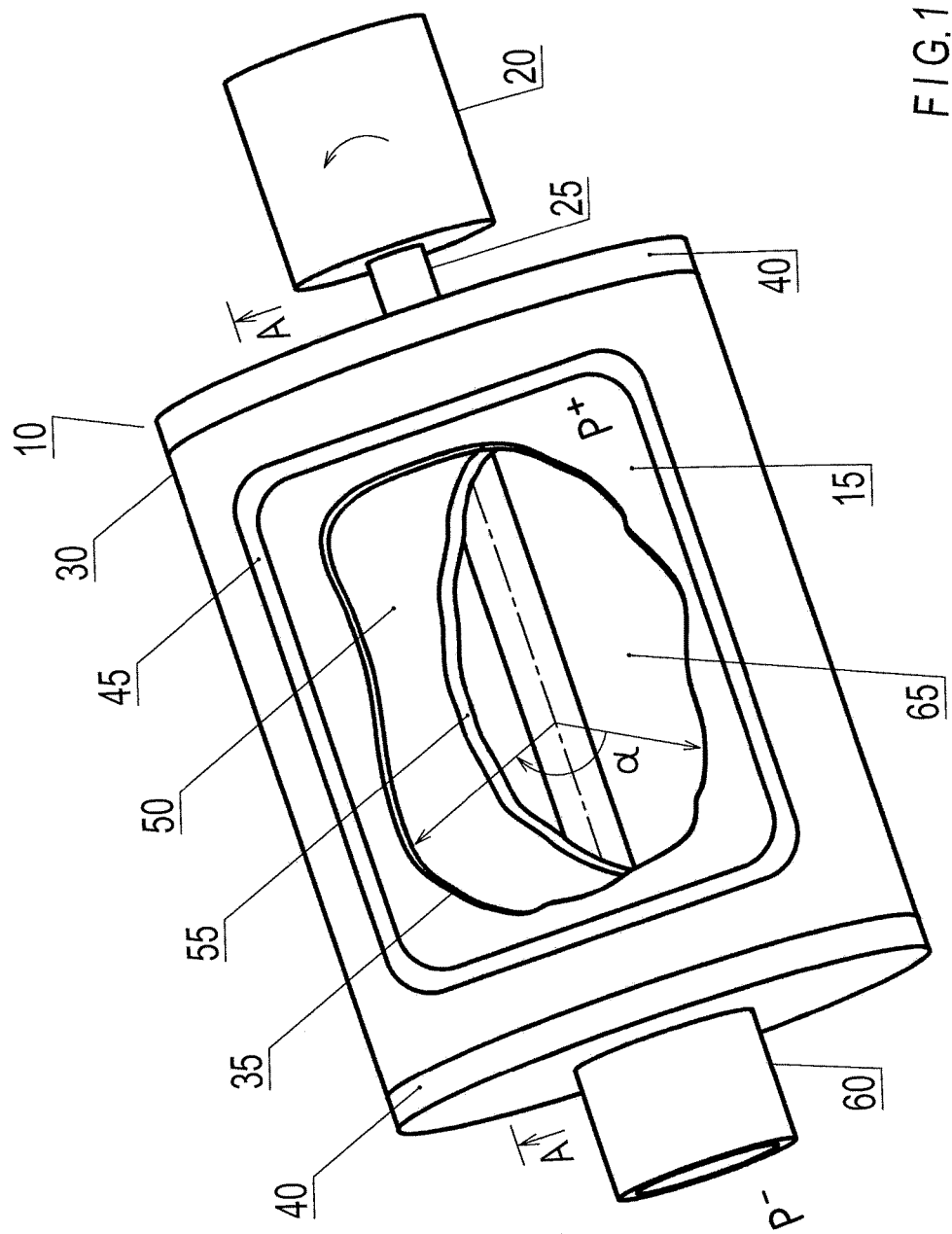
FIG. 1 is perspective view of an example of a mechanical system configured for generating pressure waves in elastic fluids.

While the present invention is susceptible of embodiment in various forms, there is shown in the drawings a number of presently preferred embodiments that are discussed in greater detail hereafter. It should be understood that the present disclosure is to be considered as an exemplification of the present invention, and is not intended to limit the invention to the specific embodiments illustrated. It should be further understood that the title of this section of this application ("Detailed Description of the Illustrative Embodiment") relates to a requirement of the United States Patent Office, and should not be found to limit the subject matter disclosed herein.

Figure 2:
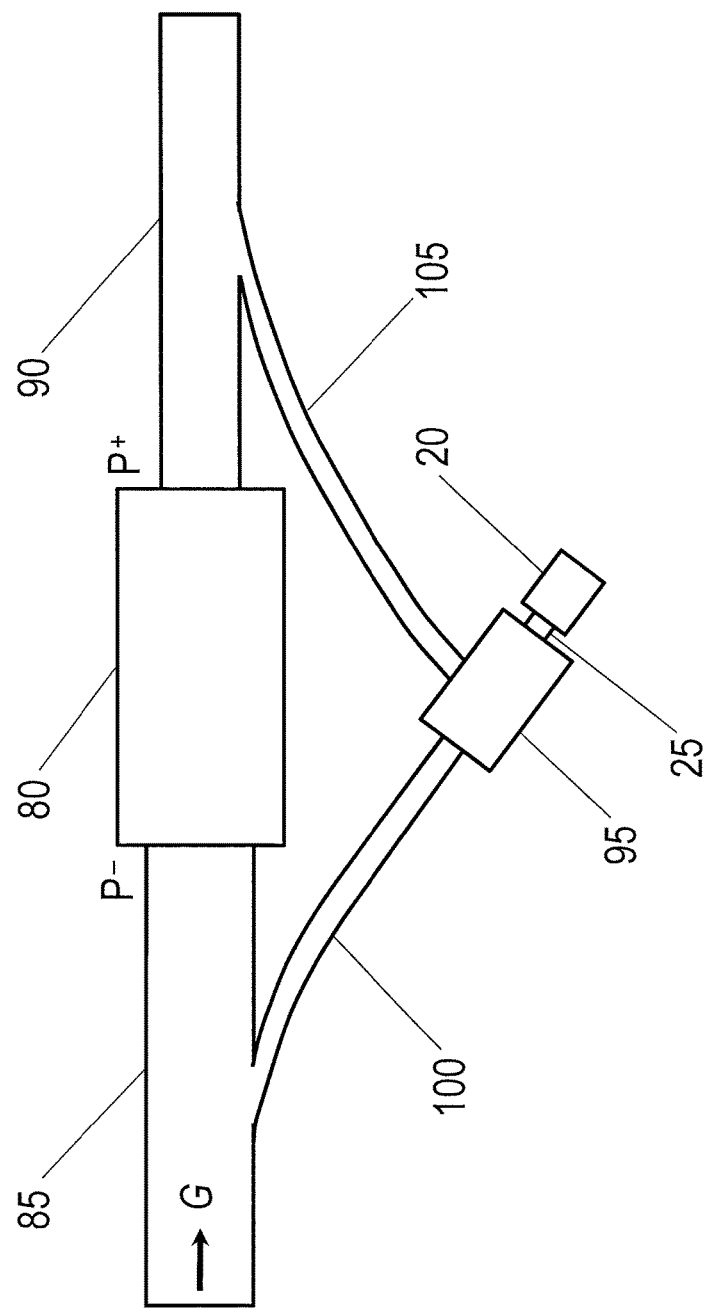
FIG. 2 is a schematic representation of an example of the mechanical system of FIG. 1 in place in a pipeline.
Figure 5:
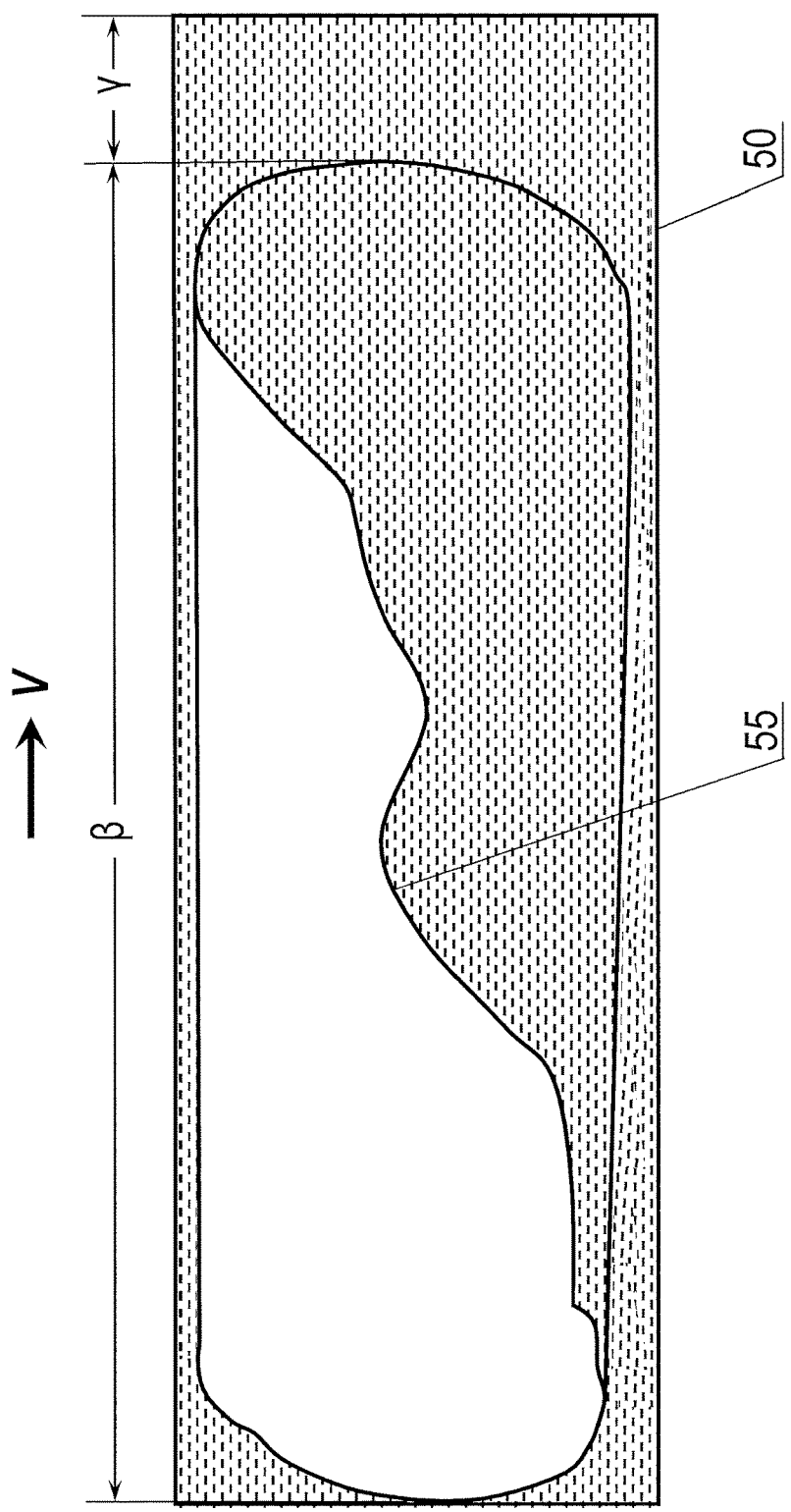
FIG. 5 is a schematic mapping of the inner cylindrical movable wall on a plane surface, comprising the single-position location of the surface of profile of cross-section of the opening.

Referring now to the drawings, where a preferred method of profiling surfaces of cross-sections of openings in the walls of elements of a mechanical system, shown as item 5 in FIG. 2, for generating pressure waves in elastic fluids is realized. As one of the possible variants of equidistantly located walls, let us consider the concentrically arranged cylindrical walls of the mechanical system for generating the pressure waves, formed from an outer housing 10 and an inner housing 15, shown in FIG. 1. A controlled drive 20 rotates a shaft 25. An outer housing 10 is fixed from rotation motion and forms a body 22, shown as item 95 on FIG. 2, of the mechanical system in a form of a second cylindrical wall 30 having an opening 35 enclosed by the polar angle alpha, α. The second cylindrical wall 30, having inner 30a and outer 30b surfaces, is rigidly connected longitudinally to the end caps 40 held in a generally parallel configuration to each other. A collector 45 covers the surface of the profile of cross-section of opening 35 externally. The collector 45 is connected with a pipe (item 105 in FIG. 2). A volume $V_2$ limited by the cylindrical fixed wall 30, the end caps 40, the collector 45 and the pipe 105, is formed in an inner chamber which is filled with elastic fluid exposed to over pressure, $P^+$ (for example, connected to a discharge pipe 90 of a pump 80, shown on FIG. 2). An inner housing 15, placed into the outer housing, formed from a first cylindrical movable wall 50, having inner 50a and outer 50b surface, and an opening 52 with a surface of profile of a cross-section 55 (partially shown in FIG. 1; the entire surface of profile of the cross-section 55 is shown in FIG. 5). The first cylindrical movable wall 50 is rigidly connected longitudinally to the end caps, 70, 70a (FIG. 3), held in a generally parallel configuration to each other. The end caps 70, 70a are rigidly connected to shaft 25 (FIG. 1). End cap 70a, located on the opposite side of the control drive 20, will be seen to have an output connected to a pipe 60. An axis of symmetry 72 of the second cylindrical wall 30, of the end caps 40, of the first cylindrical movable wall 50 and of the end caps 70 coincides with the axis 27 of rotation of shaft 25 of the control drive 20.

It will be seen, in FIG. 1, that an inner symmetrical surface 30a of the second cylindrical wall 30 is equidistantly located relatively to an outer symmetrical surface 50b of the first movable cylindrical wall 50. A volume Y, limited by the cylindrical movable wall 50, the end caps 70, 70a, and the pipe 60 form a first volume filled with elastic fluid exposed to under pressure, $P^-$ (for example, connected to a suction pipe of a pump 80 as shown in FIG. 2). The surfaces of cross-sections of profiles of openings 35 (FIG. 4) and 55 (FIG. 5) are located single-positionally in the walls 30 and 50 so that, when the wall 50 rotates, the surfaces of cross-sections of said profiles of openings 35 and 55 are intersecting and form a common surface $S_{21}$ (FIG. 6).

Figure 3:
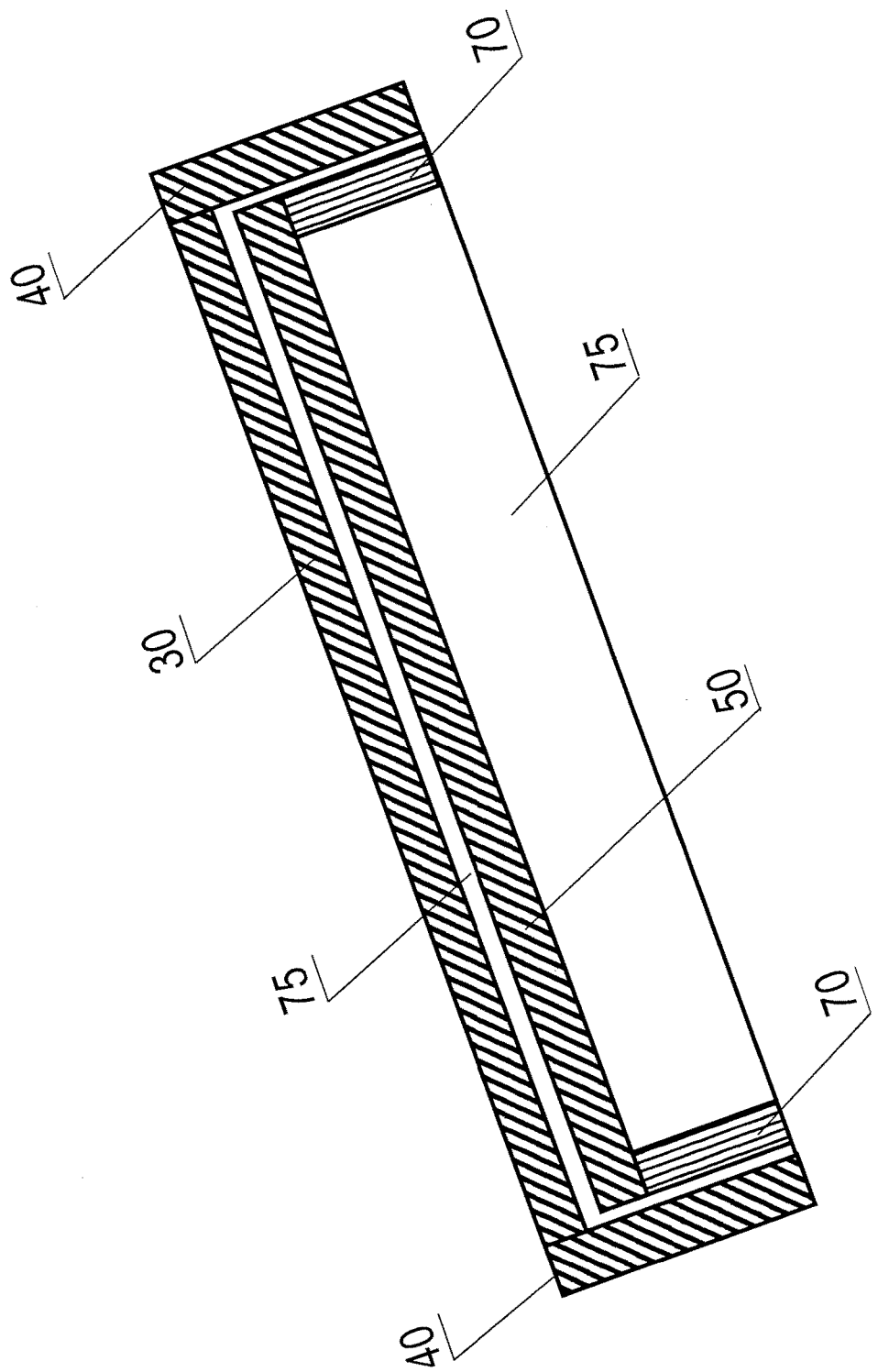
FIG. 3 is a cross-sectional view of the axial section of mechanical system for generating pressure waves in elastic fluids, taken along the line A-A of FIG. 1.
Figure 6:
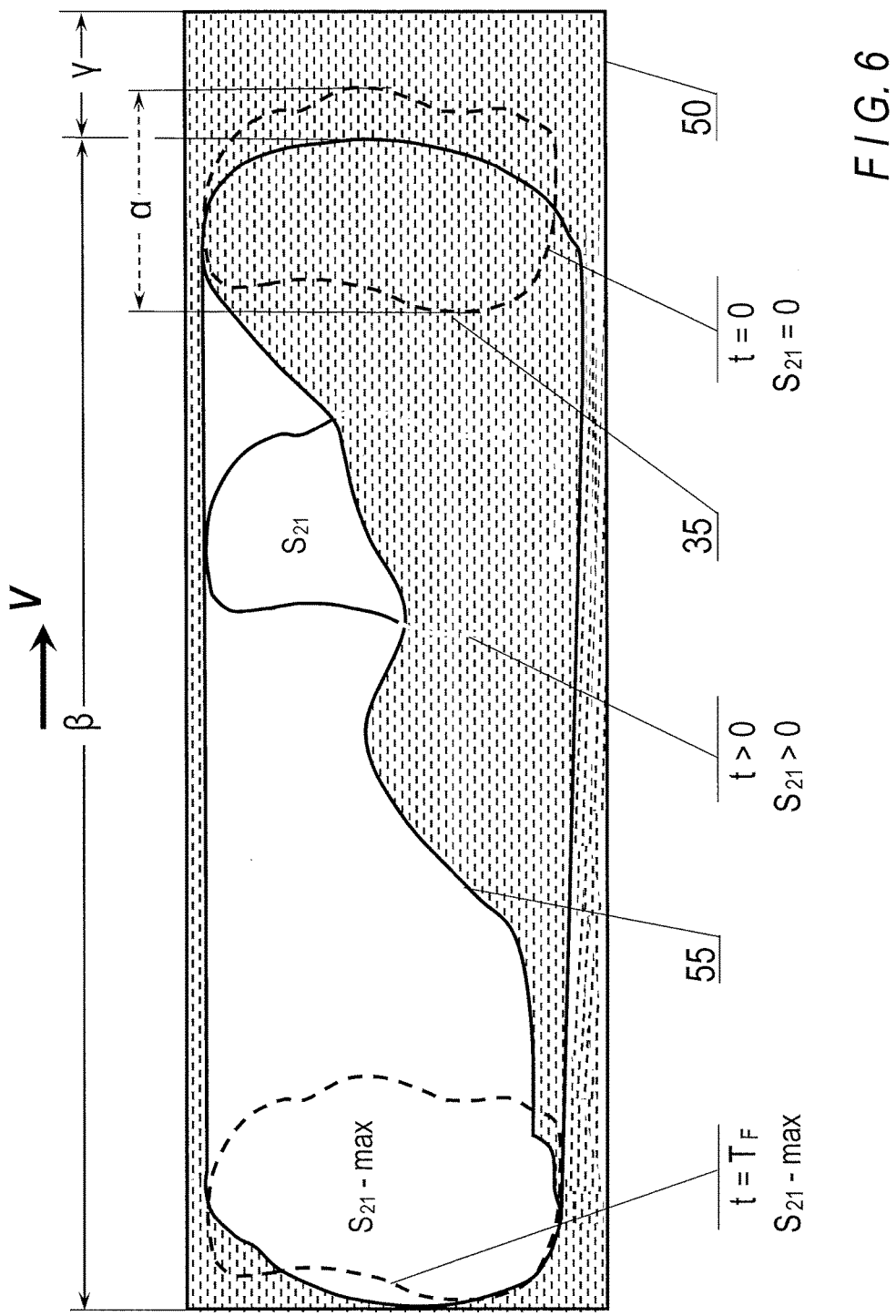
FIG. 6 is a schematic mapping of the outer cylindrical fixed wall and inner cylindrical movable wall on a plane surface, showing the relative single-position location of the surfaces of profiles of a cross-sections of openings, γ>δ.

In the operation of the mechanical system, at the initial moment of time, t=0, the value of the common surface $S_{21}$=0; the first cylindrical movable wall 50 completely overlaps the surface of cross-section of the opening 35 (as shown in the closed dashed line on the right side on the FIG. 6). In this position, the first cylindrical movable wall 50 separates the volume of elastic fluid exposed to under pressure $P^-$, applied to its inner surface from the volume of elastic fluid exposed to over pressure $P^+$, applied to its outer surface, FIG. 1. Consequently, the connection of the volumes with pressures $P^-$ and $P^+$ is carried out only through the common surface $S_{21}$, when its value is greater than zero, $S_{21}$>0. End caps 40 close the mechanical system for generating pressure waves. Through the connecting pipe 60, the inner cavity 65 of the inner chamber communicates through elastic fluid exposed to under pressure, $P^-$. The inner surface 30a of the fixed wall 30 and the outer surface 50b of the movable wall 50 are separated by a thin gap 75, as shown in FIG. 3. The end caps 70, 70a, rigidly connected to the shaft 25, enclose the inner cavity 65.

Figure 4:
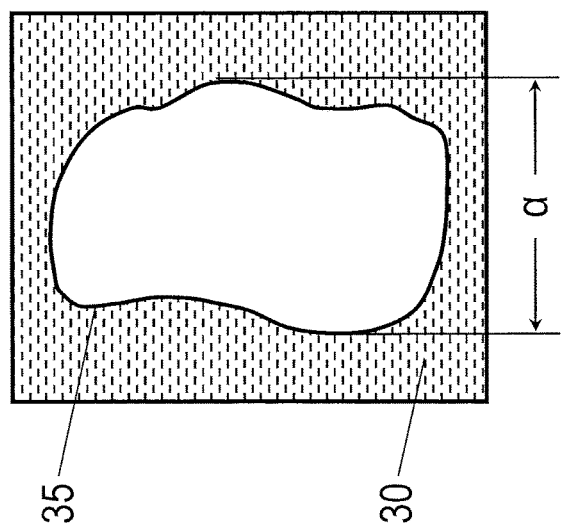
FIG. 4 is a schematic mapping of a part of the outer cylindrical fixed wall on a plane surface, comprising the single-position location of the surface of profile of cross-section of the opening.

FIG. 4 is a mapping of a part of the cylindrical surface of the outer cylindrical wall 30, on a plane surface, comprising the single-position location of the surface of profile of cross-section of the opening 35.

FIG. 5 shows a mapping of the whole surface of a first cylindrical movable wall 50 on a plane surface, comprising the single-positional profile 55 of the surface of cross-section of opening, enclosed by the polar angle beta, β; V is the direction of movement of the first cylindrical movable wall 50, V=Ω*R is the linear velocity, Ω is an angular velocity the movable wall 50, R is its radius.

Consider, for example, a mechanical system comprising a pressure wave generator 95, connected parallel to a pump 80, which is pumping elastic liquid with a flow rate G, as shown in FIG. 2. The pressures on the pump in the intake pipeline 85 and discharge pipeline 90 are equal to $P^-$ and $P^+$, respectively. The same pressures are applied in the connecting pipe 100 with the suction pipeline and in the collector 105 with a discharge pipeline, FIG. 2 (a connecting pipe 105 of the collector with a discharge pipeline 90 in FIG. 1 is not drawn.).

The method of invention is performed in the following manner. Suppose, for the purposes of simplicity, that at the initial instant of time $t_0=0$, value of the common surface $S_{21}=0$ (as represented by the closed dashed line on the right side on the FIG. 6). Consequently, the first cylindrical movable wall 50 completely overlaps the surface of cross-section of the opening 35 of the fixed wall 30. Mappings of the first cylindrical movable wall and of the second cylindrical wall on the plane is presented in FIG. 6. Besides mapping of the second cylindrical wall is located under the first movable wall, therefore, a contour line of the opening 35 is drawn as a dashed line. By turning on the drive 20, the shaft 25 rotates the movable wall 50 relatively to the fixed wall 30 around the axis of rotation 27. The process of intersection of surfaces of cross-sections of the profiles of openings 35 and 55 thereby begins. By this rotation, the value of the common surface becomes more than zero, as described here: $S_{21}>0$ for t>0, see FIG. 6.

The process of exchange of pressure impulse between the volume with under pressure $P^-$ and the volume with over pressure, $P^+$ through the common surface $S_{21}$ here begins. This process is accompanied by the generation of pressure waves on a common surface. At that, simultaneously, a rarefaction pressure wave and a compression pressure wave are generated. The rarefaction pressure wave is propagated through the elastic fluid of the inner chamber of the first housing; the compression pressure wave is propagated through the elastic fluid of the first volume, see FIG. 2. Parameters of the generated pressure waves—waveform, are defined unequivocally by the sizes of cylindrical walls 30 and 50, angular velocity of the first cylindrical movable wall 50 relatively to the fixed cylindrical wall 30, speed of change of the common surface vs. time, values of over pressure $P^+$ and of under pressure $P^-$, and physical properties of elastic fluid (density, viscosity, compressibility). This angular velocity, shapes, sizes, and single-position location of surfaces profiles of the cross-sections of openings 35 and 55 in the cylindrical walls 30 and 50 respectively of the first and of the second housing are already defined.

During the rotating motion of the cylindrical wall 50 relative to wall 30, the intersection of the surfaces of profiles of the cross-sections of openings 35 and 55 proceeds. The common surface $S_{21}$ varies periodically: it increases from zero to the maximum value and decreases from the maximum value to zero. Besides, the increase of the common surface $S_{21}$ to the maximum value during the time interval $0 \ldots T_F$ ($T_F$ being a front time of the waveform) there is carried out, by one law, and the decrease of the surface area from maximal value to zero, during the time interval $T_B=T-T_F$ ($T_B$ is the back time of the waveform) can be carried out by other law; T is a period of generated pressure waves. The laws of change of pressure (waveform) on the time intervals $0 \ldots T_F$ and $T_F \ldots T$ are defined by solving of the technological problem of maximal efficiency interaction of pressure waves with the fluid. For example, the interaction of pressure waves with a turbulence of a fluid flow in a discharge pipeline. Solution of this problem depends on the physical properties of fluid, sizes and configuration of a pipeline.

The mapping of this motion is shown in FIG. 6. During the time interval $0 \ldots T_F$, the movable cylindrical wall 50 rotates at the angle of α; simultaneously, pressures in the generated waves increase from zero to the amplitude values: $\Delta p^+$ and $\Delta p^-$, see FIG. 8. During the time interval $T_F$ the common surface $S_{21}$ decreases from the maximum value to zero, see FIG. 6, while the movable cylindrical wall 50 rotates on the angle β.

The pressure in the waves is restored: in the compression wave, from $\Delta p^+$ to $P^-$, and in the rarefaction wave, from $\Delta p^-$ to $P^+$. Wherein, the period of variation of the common surface $S_{21}$ is equal to the period of the generated waves, T. The compression pressure wave $\Delta p^+$ is formed only as a result of the exchange of the pressure impulse on the common surface $S_{21}$ during the change of said surface from zero to the maximum value and from the maximal value to zero. On the time interval $0 \ldots T_F$ the rarefaction pressure wave is forming as a result of the change on pressure impulse between the volumes with different pressures, $P^-$ and $P^+$ while the common surface $S_{21}$ is increasing. The recovery of pressure in rarefaction wave on the time interval $T_F \ldots T$ is due not only to decrease of the change of pressure impulse by the decrease of the common surface $S_{21}$ from a maximum value to zero, but also partially due to the reflection of the pressure impulse from the outer surface of the movable wall 55.

Analysis of the Shapes of the Laws of Change of the Pressure in Generated Waves.

In FIGS. 6 and 7, it will be seen that the mapping of the entire cylindrical surface of the fixed wall 30 and movable wall 50's cylindrical walls on the plane surface comprising the surfaces of cross-sections of profiles of the openings 35 and 55, respectively, are presented. The profile of the opening 55 on the cylindrical surface enclosed by the polar angle beta, β. The angle gamma, γ, encloses a part of cylindrical movable wall 50 not comprising any part of the profile of the opening 55. The ratio between the angles γ and δ is controlling the value of the delay of repetition of the pressure pulses in the generated wave.

At β+γ=2π, two cases are possible. γ=δ, see FIG. 7 and γ>δ, see FIG. 6. At retaining the shape, dimensions and the same location of the cross-sections of the profile of the surface of openings and the conditions γ=δ and γ>δ are provided on cylindrical elements of different radii. When gamma is equal to delta, FIG. 7, the following laws of pressure change in a generating waves are possible: symmetrical law, for example, sinusoidal, parabolic, see FIG. 8, and asymmetrical, to the right or to the left, see FIG. 10 and FIG. 11, respectively.

Let us consider the case of γ=δ. In this case the symmetrical, FIG. 7 and asymmetrical, FIG. 9 waveform of the generated waves is provided. These waveforms are obtained for $T_F=T/2$. The essence of generating pressure waves by the given waveform is the following: it is necessary to provide such sizes, shapes, dimensions and single-position location of the surfaces of cross-sections of profiles of the openings 35 and 55 in the fixed and movable walls 30, 50 of the cylindrical elements of the mechanical system which, when these surfaces are intersecting during the relative motion of said elements, such law of change of the common surface $S_{21}$ of the volumes with different pressures $P^-$ and $P^+$ is realized, which provides the generating of the pressure waves by the given waveform/law. Parameters of generated pressure waves relate to physical properties of fluid: density viscosity, compressibility.

If the cross-section area $S_{12}$ increases from zero to the maximum value at the time interval $T_F=T/2$, then the pressure waves are generated according to a symmetric waveform/law. If the cross-section area $S_{21}$ increases to the maximum value and decreases to zero by a symmetric law, for example: on parabola, then the law of pressure change in the generated wave is also symmetrical, see FIG. 8. If these laws are different then the waveform of pressure change of the generated waves are also different, see FIG. 9 and FIG. 10.

Let's assume that for improve the energy efficiency of a technological process is necessary to generate a pressure wave with the determined specified asymmetric waveform/law of change of pressure vs. time, for example, $T_F<T/2$, by $\gamma=\delta$. Then is necessary to provide such sizes of cylindrical walls, shapes, sizes and the single-position location of profile of the surfaces of cross-sections of openings 35 and 55 in the fixed and movable walls 30, 50 of these housings that would increase the value cross-section area $S_{21}$ from the maximum value by one law and a decrease of $S_{21}$ from the maximal value to zero by another law. The law of change of surface of cross-section $S_{21}$ vs. time should provide the generation pressure waves of the required parameters. By changing the shape, sizes and location of profile of surfaces of cross-section of opening 55 could be readily obtained the law of change of the cross-section area $S_{21}$ which generates a pressure wave by the law shown in FIG. 11.

If the $\gamma>\delta$, see FIG. 5, then the impulses in the generated pressure wave follow with a certain delay, see FIGS. 12 and 13. The value of the pressure pulse delay is determined by the technological problems. Physically, this is provided by increasing of the surface of cross-section of opening 55, of the movable wall 50, see FIG. 5; that is, by another choice of shape, sizes and location of the single-position profile of the surface of cross-section of opening 55.

For the same shape and sizes of the profiles as well as the single-position location of profiles of the surfaces of cross-sections of the opening 35 and 55, for the same speed of rotation of the movable wall 50 the amplitude of generated pressure waves is inversely proportional to the compressibility of the elastic fluid.

From this physical condition follows the limitation of the lower sizes on the geometric dimensions of the elements of the mechanical system for generating pressures waves, mentioned above. Hence, the comparative evaluation of the shape and sizes of profiles of the cross-sections of the openings 35 and 55 depends on the elastic properties of the fluid. The elastic properties of the fluid are given in initial conditions of the problem as a technological parameter.

To improve the energy efficiency of a technological process, for example, transporting of a medium flow through a discharge pipeline, is necessary to change the interaction between full specific energy of the flow and the specific wave energy of generated pressure waves (symmetrical or asymmetrical) and their propagating through the flow. This is provided by changing of a value of frequency of generating pressure waves with simultaneously changing of the front time, back time and amplitude (whole waveform). These lead to change and to adjusting such the structure of the flow, which provides a maximal value of energy efficiency of pipeline transporting process, which is confirmed by minimal value of the pressure difference ($P^+-P^-$) measured on the pump.

Based on this:

The waveform/law of the pressure change in the generated waves is determined by the pressure difference ($P^+-P^-$) measured on the pump, sizes of cylindrical walls, by the shape and sizes of surfaces of profiles of cross-sections of openings and their single-position location in the first and second walls and is carried out so, that provides the requested law of change of the common surface $S_{21}$ which provides the generation of the pressure waves by predetermined law.

What is claimed:

1. A method of optimizing a value of at least one characteristic of an elastic fluid flow in a mechanical system for the moving of elastic fluid flows through conduits, with respect to energy efficiency of the flow process of the elastic fluid, comprising the steps of:

providing a mechanical system comprising:
a controlled drive;
a first housing having an inner chamber formed with a first end cap and a second end cap held in a generally parallel configuration to each other and rigidly connected to a shaft of the controlled drive so that it is rotatable, the first housing having a first wall, having an inner surface and an outer surface and a first longitudinal end and a second longitudinal end and a first lateral end and a second lateral end, and an opening defined in the first wall, the first wall being connected to the first end cap and the second end cap, respectively at its first longitudinal end and its second longitudinal end, the first lateral end being joined to the second lateral end to form, with the first end cap and second end cap, a container, the first housing having an output connected to a first pipe, wherein, the inner chamber of the housing and the first pipe form together a first volume filled with elastic fluid exposed to an under pressure;
a second housing having an inner chamber, within which the first housing is placed, the second housing being fixed from rotation and formed with a third end cap and a fourth end cap held in a generally parallel configuration to each other, a second wall having an inner and outer surface, the second wall having a first longitudinal end and a second longitudinal end and a first lateral end and a second lateral end, and an opening defined in the second wall, the second wall being connected to the third end cap and the fourth end cap, respectively at its first longitudinal end and its second longitudinal end, the first lateral end being joined to the second lateral end to form, with the third end cap and fourth end cap, a container, and an opening defined therein, the inner surface being located equidistantly from the outer surface of the first wall of the first housing when the first housing is placed within the second housing, the second housing having an input connected to a second pipe, the second housing and the second pipe form together a second volume filled with the first housing and an elastic fluid exposed to an over pressure;
the axis of symmetry of the first housing and the second housing coinciding with the axes of rotation of the shaft of the controlled drive;
wherein the mechanical system comprises a pump and a pressure waves generator configured for generating longitudinal pressure waves by rotating the first housing within the second housing creating an intersection of the surface of a cross-sectional opening in the first wall with the surface of a cross-sectional opening in the second wall during the rotating motion of the first wall relatively to the second wall by the drive, and for providing for the propagating of the generated waves through elastic fluid flow though conduits;

generating pressure waves in elastic fluid by using the pressure wave generator;

evaluating geometrical sizes of the first wall;

providing a shape of a profile of a cross-sectional opening in the first wall of the inner chamber and providing the sizes of a profile of a cross-section opening in the first wall;

evaluating geometrical sizes of the second wall;

providing a shape of a profile of a cross-section opening in the second wall of the inner chamber and providing sizes of a profile of a cross-section opening in the second wall;

providing the single-position location of the surface of the cross-section opening in the first wall of the inner chamber and of the surface of the cross-section opening in the second wall of the inner chamber so, that during the rotating of the first wall relatively to the second wall there is provided a periodic intersection of the surfaces of cross-sectional openings which forms a common surface between the first volume and the second volume with changeable shape and sizes depending on the intersected surfaces of profiles of the openings whose shape and sizes of the common surface are changing periodically and univocal versus time by a determined law;

increasing the common surface from zero to the maximal value during a front time of each period;

decreasing the common surface from the maximal value to zero during a back time of each period;

providing a periodic connection of the first volume with the second volume through the common surface;

generating simultaneously a compression pressure wave and a rarefaction pressure wave on the common surface;

providing an amplitude of generating compression pressure wave and a rarefaction pressure waves in correspondence with the amplitude of the common surface and values of over pressure and under pressure;

providing a frequency of generating compression pressure waves and a rarefaction pressure waves in correspondence with the frequency of the common surface;

providing a waveform of generating compression pressure wave and rarefaction pressure waves in correspondence with the form of the common surface and values of over pressure and under pressure;

generating and propagating compression pressure waves through elastic fluid in the first volume, generating and propagating rarefaction pressure waves through elastic fluid in the second volume;

controlling an average value of a total specific energy of the elastic fluid flow by using a difference between over pressure and under pressure of the first volume and the second volume;

evaluating of specific average value of a wave energy of pressure waves propagating and interacting with the elastic fluid flow during a period considering a density, viscosity and compressibility of the fluid flow;

evaluating of a specific value of a ratio of an average value of specific wave energy of generating pressure waves propagating and interacting with the elastic fluid flow during a period and an average value of a total specific energy of the elastic fluid flow;

changing a value of at least one of the parameters of the generating waves consisting of the shapes, sizes and single-position location of surfaces profiles of cross-section openings, amplitude, frequency and waveform of generating compression and rarefaction pressure waves so, that an energy efficiency of a process of generating pressure waves determined by minimal value of the specific ratio and therefore a maximum energy efficiency of the interaction of the specific wave energy with the elastic fluid flow is optimized.

2. The method as defined in claim 1, further providing the sizes of the first wall of the first housing and of the second wall of the second housing and such shape and sizes of the profile of a cross-sectional opening and single-position location of the profile in the first wall of the first housing and a shape and sizes of a profile of a cross-sectional opening and single-position location of the profile in the second wall of the second housing which causes the generation of pressure waves by the symmetrical law of change of pressure versus time.

3. The method as defined in claim 1, further providing the sizes of the first wall of the first housing and of the second wall of the second housing and such shape and sizes of the profile of a cross-sectional opening and single-position location of the profile in the first wall of the first housing and a shape and sizes of a profile of a cross-sectional opening and single-position location of the profile in the second wall of the second housing which causes the generation of pressure waves by the asymmetrical law of change of pressure versus time.

* * * * *